(12) United States Patent
François et al.

(10) Patent No.: US 10,761,003 B2
(45) Date of Patent: Sep. 1, 2020

(54) METHOD AND SYSTEM FOR ANALYZING CUTTINGS COMING FROM A WELLBORE

(71) Applicant: Geoservices Equipements, Roissy en France (FR)

(72) Inventors: Matthias François, Roissy-en-France (FR); Maurice Ringer, Roissy-en-France (FR); Josselin Kherroubi, Clamart (FR); Karim Bondabou, Roissy-en-France (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 333 days.

(21) Appl. No.: 15/845,284

(22) Filed: Dec. 18, 2017

(65) Prior Publication Data
US 2018/0180524 A1 Jun. 28, 2018

(30) Foreign Application Priority Data
Dec. 23, 2016 (EP) .................................. 16290249

(51) Int. Cl.
*G01N 15/02* (2006.01)
*G06K 9/46* (2006.01)
(Continued)

(52) U.S. Cl.
CPC ......... *G01N 15/0227* (2013.01); *E21B 49/08* (2013.01); *G01N 15/1475* (2013.01);
(Continued)

(58) Field of Classification Search
CPC ........ G06T 7/11; G01N 15/1475; G01N 8/02; G06K 9/342; G06K 9/4642
See application file for complete search history.

(56) References Cited

U.S. PATENT DOCUMENTS

| 2010/0128933 A1 | 5/2010 | Derzhi et al. |
| 2015/0043787 A1 | 2/2015 | Fredrich et al. |

FOREIGN PATENT DOCUMENTS

WO  2016115471  7/2016

OTHER PUBLICATIONS

Chen et al, "Digital image-based numerical modeling method for prediction of inhomogeneous rock failure", Internal journal of rock mechanics and mining sciences, Sep. 2004, Sep. 2004, pp. 939-957 (Year: 2004).*

(Continued)

*Primary Examiner* — Edward Park

(57) ABSTRACT

The disclosure relates to a method for analysing cuttings exiting a borehole. The method comprises taking at least an image of a sample of cuttings on a background surface, obtaining spectra representative of the image in the (hue, saturation, brightness) coordinate space, wherein each spectrum is associated to a coordinate and is representative of the distribution of the values of the pixels for the coordinate. Based on the spectrum and the values of each pixel for the associated coordinate, classifying the pixel in one of a plurality of groups, wherein each group is representative of a type of objects within the image, i.e. cuttings and background surface. The method also comprises determining at least a cuttings zone in the image based on the classification of the pixels.

10 Claims, 6 Drawing Sheets

(51) Int. Cl.
*G06T 7/11* (2017.01)
*G06K 9/34* (2006.01)
*E21B 49/08* (2006.01)
*G01N 15/14* (2006.01)
*G01V 8/02* (2006.01)

(52) U.S. Cl.
CPC .............. *G01V 8/02* (2013.01); *G06K 9/342* (2013.01); *G06K 9/4642* (2013.01); *G06T 7/11* (2017.01); *G06T 2207/10024* (2013.01); *G06T 2207/30108* (2013.01)

(56) References Cited

OTHER PUBLICATIONS

Mukherjee et al, "Ore image segmentation by learning image and shape features", Pattern recognition letters, Apr. 15, 2009, pp. 615-622 (Year: 2009).*

Search Report issued in European Patent Application 16290249.8 dated Jul. 3, 2017. 13 pages.

Chen et al., "Digital image-based numerical modeling method for prediction of inhomogeneous rock failure" International Journal of Rock Mechanics and Mining Sciences, vol. 41 No. 6. Sep. 1, 2004. pp. 939-9579. United Kingdom.

Mukherjee et al., "Ore image segmentation by learning image and shape features" Pattern Recognition Letters. Elsevier. Amsterdam, NL. vol. 30 No. 6 Apr. 15, 2009. pp. 615-622.

Gonzalez et al., "Digital Image Processing 3rd" In: "Digital Image Processing 3rd" Jan. 1, 2008. pp. 442-445.

Gao et al., "Rock Image Segmentation", Jan. 1, 1989, Retrieved from the Internet: URL: http://www.cipprs.org/papers/VI/VI1989/ppl25-133-Gao-Wong-1989.pdf retrieved on Jun. 7, 2017.

Zafari et al., "Segmentation of Partially Overlapping Convex Objects Using Branch and Bound Algorithm" In: "Network and Parallel Computing", Nov. 20, 2016, Springer International Publishing, Cham 032548, vol. 10118, pp. 76-90.

Amankwah et al., "Automatic ore image segmentation using mean shift and watershed transform." Radioelektronika, 2011 21st International Conference, IEEE, Apr. 19, 2011, pp. 1-4.

Baklanova et al., "Cluster analysis methods for recognition of mineral rocks in the mining industry." 2014 4th International Conference on Image Processing Theory, Tools and Applications (IPTA), IEEE, Oct. 14, 2014, pp. 1-5.

* cited by examiner

METHOD AND SYSTEM FOR ANALYZING CUTTINGS COMING FROM A WELLBORE

CROSS REFERENCE TO RELATED APPLICATIONS

This application claims priority to and the benefit of European Patent Application No. 16290249.8, titled "Method and system for analyzing cuttings coming from a wellbore," filed Dec. 23, 2016, the entire disclosure of which is hereby incorporated herein by reference.

BACKGROUND

The disclosure relates to a method and system for analysing cuttings coming from a wellbore and obtained during drilling, as well as to a computer program for analysing cuttings based on an image of a sample of the cuttings on a background surface During the drilling process of an oil well or of a well of another effluent—in particular gas, vapour or water—, cuttings are brought to the surface after they have been cut from the formation by drilling mud circulating in the wellbore.

It is known to carry out analysis of the rock cuttings brought to the surface. Such analysis allows the creation of a detailed record of the geologic formations of a borehole, in function of the well bore depth and may allow to derive information for instance concerning the lithology of the formation.

Among several known analyses, it is common to take at least an image of a sample of cuttings on a background surface, in particular via a high resolution microscope.

Generally, this image is analysed by a geologist in order to determine the size of the cuttings, and, if possible the nature of the cuttings. Such work takes a substantial amount of time and is generally performed in a lab away from the drilling installation.

SUMMARY

The disclosure relates to a method for analysing cuttings exiting a borehole. The method comprises taking at least an image of a sample of cuttings on a background surface, obtaining spectra representative of the image in the (hue, saturation, brightness) coordinate space, wherein each spectrum is associated to a coordinate and is representative of the distribution of the values of the pixels for the coordinate. Based on the spectrum and the values of each pixel for the associated coordinate, classifying the pixel in one of a plurality of groups, wherein each group is representative of a type of objects within the image, i.e. cuttings and background surface. The method also comprises determining at least a cuttings zone in the image based on the classification of the pixels.

It also relates to a system for analyzing cuttings exiting a borehole comprising an imaging device for taking at least an image of a sample of cuttings on a background surface and a calculator. The calculator is configured, for an image, to obtain spectra representative of the image in the (hue, saturation, brightness) coordinate space, wherein each spectrum is associated to a coordinate and is representative of the distribution of the values of the pixels for the coordinate. It is also configured to classify the pixel in one of a plurality of groups, wherein each group is representative of a type of objects within the image, i.e. cuttings and background surface, based on the spectrum and the values of each pixel for the associated coordinate and to determine cuttings zone in the image based on the classification of the pixels.

The system and method according to the disclosure enable to get accurate information in a minimum amount of time regarding the imaged cuttings.

The disclosure also relates to a computer program for analyzing cuttings exiting the wellbore based on an image of a sample of the cuttings on a background surface. The program comprises machine-readable instructions to obtain spectra representative of the image in the (hue, saturation, brightness) coordinate space, wherein each spectrum is associated to a coordinate and is representative of the distribution of the values of the pixels for said coordinate, to classify the pixel in one of a plurality of groups, wherein each group is representative of a type of objects within the image, i.e. cuttings and background surface, based on the spectrum and the values of each pixel for the associated coordinate and to determine cuttings zone in the image based on the classification of the pixels.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are examples of the presently disclosed techniques. Additionally, in an effort to provide a concise description of these embodiments, some features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would still be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Figure 1:
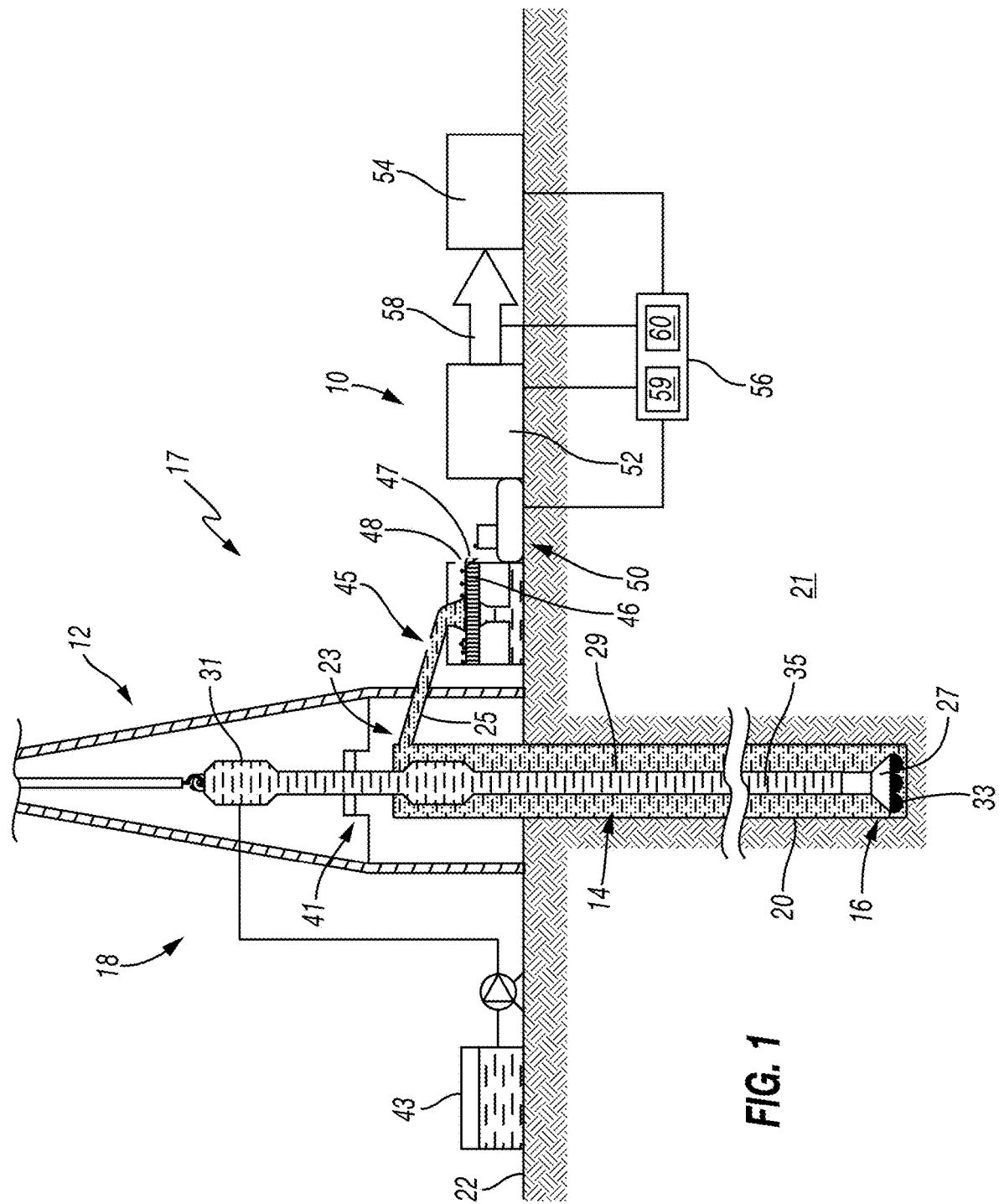
FIG. 1 is a schematic diagram of a drilling installation comprising a system according an embodiment of the disclosure.

An installation 12 for drilling a borehole is described on FIG. 1.

Such an installation 12, comprises a rotary drilling tool 14 drilling a cavity 16; a surface installation 18, where drilling pipes are placed in the cavity 16.

A borehole 20, delimiting the cavity 16, is formed in the substratum 21 by the rotary drilling tool 14. At the surface 22, a well head 23 having a discharge pipe 25 closes the borehole 20.

The drilling tool 14 comprises a drilling head 27, a drill string 29 and a liquid injection head 31.

The drilling head 27 comprises a drill bit 33 for drilling through the rocks of the substratum 21. It is mounted on the lower portion of the drill string 29 and is positioned in the bottom of the drilling pipe 20.

The drill string 29 comprises a set of hollow drilling pipes. These pipes delimit an internal space 35 which makes it possible to bring a drilling fluid from the surface 22 to the drilling head 27. To this end, the liquid injection head 31 is screwed onto the upper portion of the drill string 29.

The drilling fluid is a drilling mud, in particular a water-based or oil-based drilling mud.

The surface installation 18 comprises a support 41 for supporting the drilling tool 14 and driving it in rotation, an injector 43 for injecting the drilling fluid and a shale shaker 45.

The injector 43 is hydraulically connected to the injection head 31 in order to introduce and circulate the drilling fluid in the inner space 35 of the drill string 29.

The shale shaker 45 collects the drilling fluid charged with drilling residues, known as cuttings, said drilling fluid flowing out from the discharge pipe 25. The shale shaker comprises a sieve 46 allowing the separation of the solid drilling cuttings 47 from the drilling mud. The shale shaker 45 also comprises an outlet 48 for evacuating the drilling cuttings 47.

Cuttings obtained at the outlet 48 have been cut from the formation when drilling and may be useful in order to evaluate the formation and characterize one or several of its properties, such as its mineralogy, lithology, porosity, density, etc. It is known to perform analysis on the cuttings in order to derive at least some of these properties from such analysis.

The disclosure relates to a method and system for analysing cuttings exiting the borehole via the outlet 48 for instance. The system may be situated at the rig site, in the vicinity of the shale shaker 45 as is disclosed on FIG. 1 or in a cabin a few hectometres from the shale shaker or away from the rig site, in a laboratory.

The system according to the disclosure comprises a sampler for collecting the cuttings at the outlet 48. The sampler is here a container 49. It also comprises an imaging device 54 for taking at least an image of a sample of cuttings on a background surface. The imaging device (also called imager in the following of the specification) is for instance an optical or electronic microscope.

The system may also comprise a preparation unit 52 for instance for washing, drying, separating, etc. the cuttings of the sample.

In the embodiment shown on FIG. 1, the sample of cuttings is automatically sampled, transferred to the preparation device 52 and then to imaging device 54 via a conveyor 50 and atransport device 58. The preparation and/or imaging may be performed automatically via any appropriate devices commanded via an appropriate sequence of actions of devices 52, 54. Alternatively, any conveyance device may also be used for transporting the cuttings The system also comprises a calculator 56 connected at least to the imager in order to receive images taken by the imager. The calculator may be a personal computer for instance. It may comprise a storage unit for storing programs and a processor for executing one or several programs as well as a communication module for communication at least with the imager. The calculator 56 may comprise an analysis module 59 in order to analyze the image taken by the imager as will be described below. It may also optionally comprise a control unit 60 for controlling the preparation and imaging of the sample in which case it is also able to communicate with the conveyor 50, the preparation device 52, the imager 54 and the transport device 58. The calculator may be situated in the vicinity of the imager or remotely from the imager. It may also comprise several modules situated at different locations, for instance one situated in the vicinity of the imager and one situated remotely from the imager.

The installation described above is only exemplary. In another embodiment, the sample may be manually collected, and transferred by an operator to a cabin and imaged, and optionally prepared, there.

The method 100 according to an embodiment of the disclosure will now be described in accordance with FIG. 2. The method first comprises collecting a sample of cuttings (block 102) at the outlet 48 of the shale shaker 45. As indicated earlier, collection may be performed in any manner, manually or automatically, in a bag or in a container, etc. Then the method comprises preparing the sample for the imaging (block 104). The preparation may comprise sequentially washing, rinsing, drying, sieving the sample of rocks or at least one of these operations. Preparation is optional.

Then, the method may comprise placing the prepared sample of rocks on a background surface (block 106). The background surface may be a surface of any color. A reference background surface may be determined for better results but the method may as well be performed with several background surfaces having different color properties. Once the cuttings have been placed on the background surface, the method comprises taking an image of the sample of cuttings on the background surface (block 108) with the imaging device such as the optical or electronic microscope. An exemplary image 109 is shown on FIG. 3. On this image a background surface 110 is shown as well as cuttings 112A, 112B distributed on the background surface 110.

Once the image has been taken, the method comprises the operation of analysing the image (block 113). This operation is performed by the calculator 56. Its purpose is to separate cuttings zone from background zones in the image. It will enable to characterize, once the cuttings zone have been identified, one or more properties of the cuttings.

This operation first comprises collecting the coordinate values of all of the pixels in the image in the (red, blue, green) space (block 114) and to convert these values in coordinate values in the (hue, saturation, brightness) coordinate space (block 116). In the following, (hue, saturation, brightness) coordinate space will also be designated by (H,S,B) space. The (H,S,B) space is a well-known space in the image processing field. Hue is a coordinate representative of the color itself while saturation is the expression of the color intensity/purity and brightness represents the brilliance.

Once the values of all the pixels are obtained in the (H,S,B) space, the method comprises building a spectrum representative of the image in the (H,S,B) space (block 118). It consists in representing, for each coordinate, the distribution of the pixels of the image in view of their values for said coordinate. It comprises plotting the spectrum (block 120). The plotted spectrum represents for instance a number of pixels having a given value of hue, for each hue value (if the spectrum is a hue spectrum). The coordinate values may be normalized for facilitating its processing, i.e. the lowest hue value is set to 0 and the highest is set to 1.

In order to highlight a trend in the spectrum, the method may comprise filtering the spectrum before plotting it (block 122). In a particular embodiment, filtering the spectrum comprises discretizing the coordinate values of the pixels, ie defining a finite numbers of values within the value range of all of the pixel of the image (the range being for instance [0;1] when the coordinates are normalized) and linking each value of each pixel to one of the discrete value, ie the value to which it is the closest. For instance, discretizing the coordinate values of the pixels comprises the following operation in a normalized coordinate space in which 11 discrete values are obtained:

$$E=\{0; 0.1; 0.2; \ldots ; 0.9; 10\}$$

$$\text{Proj}:x \rightarrow \text{Proj}(x)=\{y \in E | x \in [y-0.05:y+0.05[\}$$

Of course, this is only an example and any number of discrete values may be chosen to build the spectrum. The filtering of the spectrum is optional or may also be performed in any other appropriate way.

Figure 2:
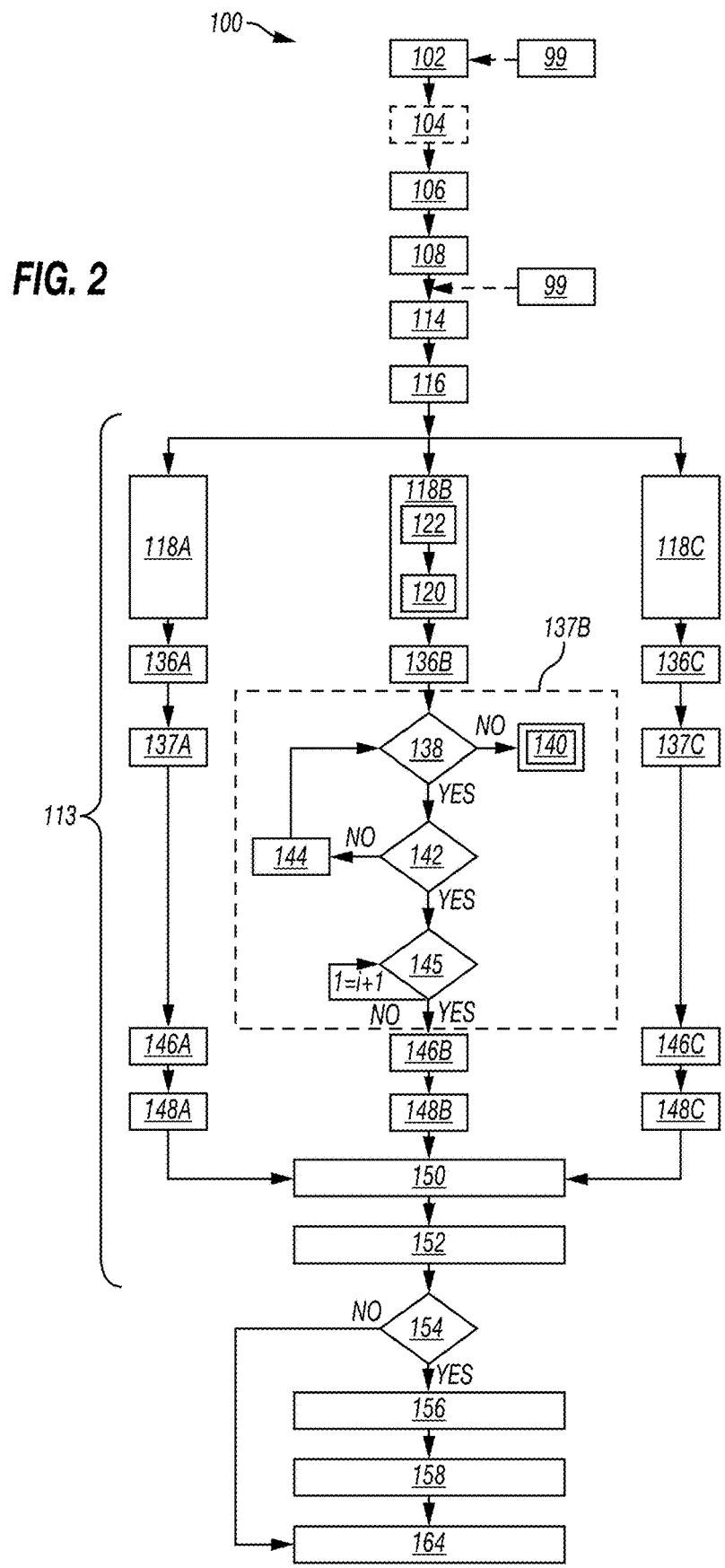
FIG. 2 is a flow diagram of a method according to an embodiment of the disclosure.

The method comprises performing operation 118 for all three coordinates of the (H,S,B) coordinate space i.e. hue, saturation and brightness, as shown by operations 118A, 118B and 118C on FIG. 2. These operations may be performed sequentially or in parallel for the three coordinates. They are represented as performed in parallel on the flow chart of FIG. 2.

Figure 3:
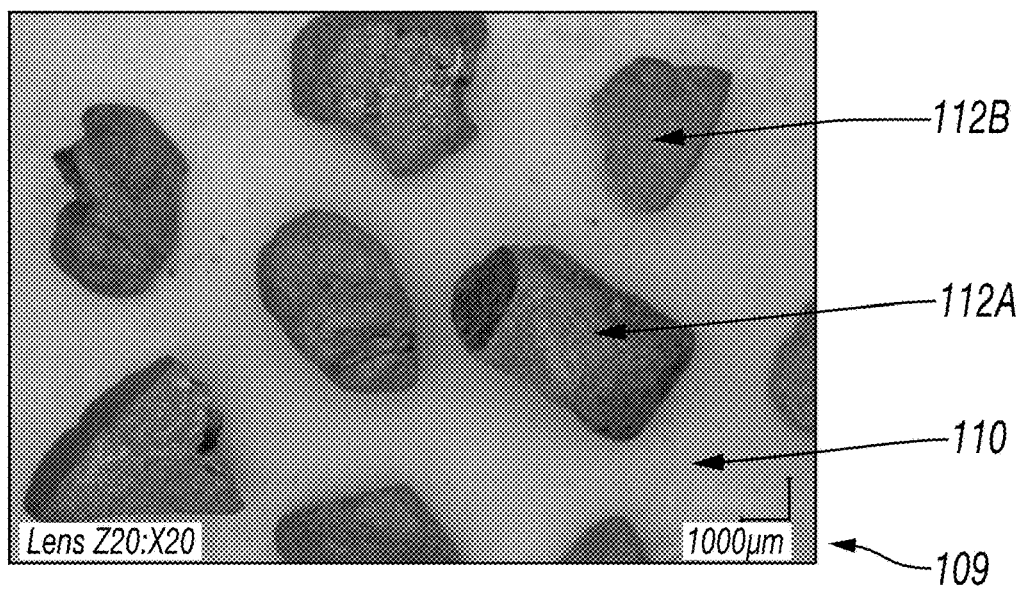
FIG. 3 is an image of cuttings exiting the wellbore analyzed as part of the method according to FIG. 2
Figure 4:
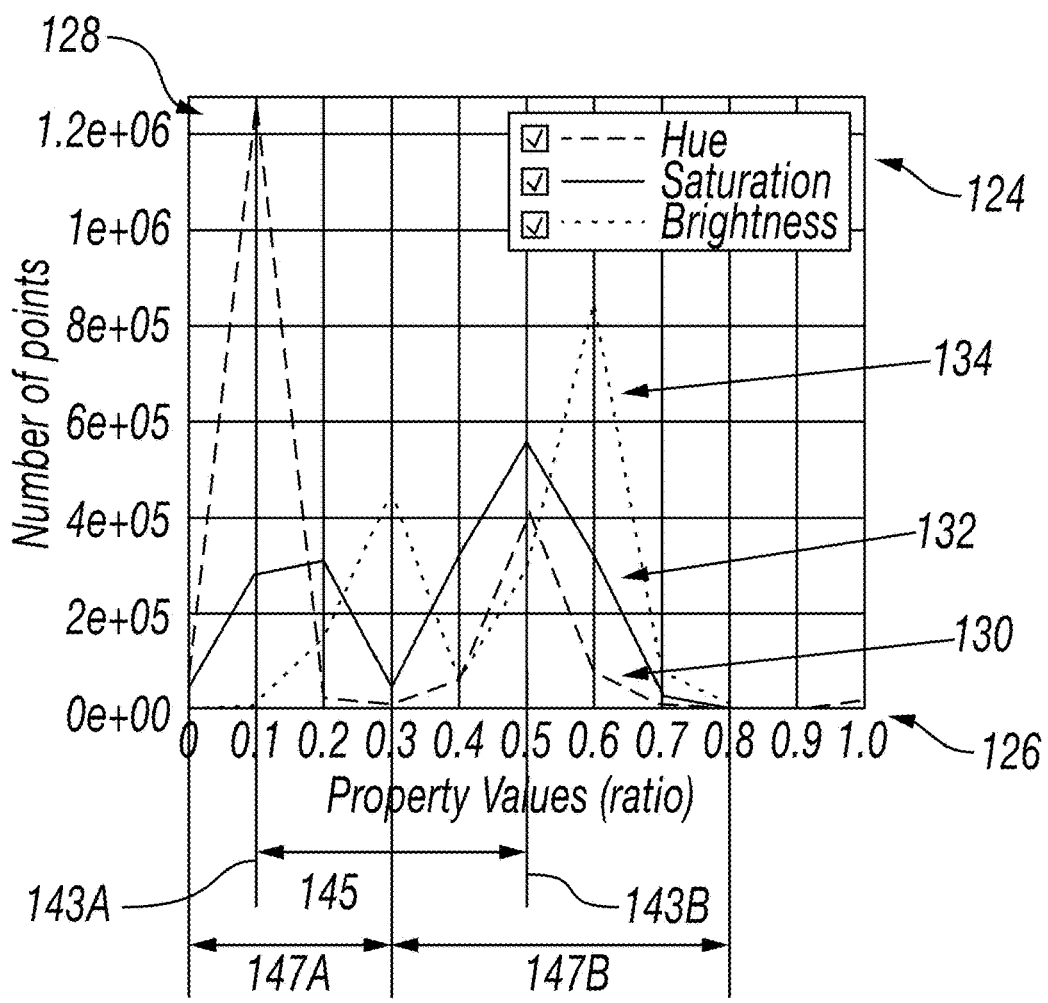
FIG. 4 is a spectrum of the image of FIG. 3 in the (hue, saturation, brightness) coordinate space, obtained as part of the method according to FIG. 2.

FIG. 4 shows a plot 124 representing spectra obtained for the image of FIG. 3 after the operation 118. The plot 124 shows in absciss 126 the normalized value of the coordinates and in ordinate 128 the number of pixels having a given normalized value (possibly discrete). It also shows the spectrum corresponding to hue in dashed line (130), the one corresponding to saturation in straight line (132) and the one corresponding to brightness in dotted line (134).

Once the spectrum for each coordinate has been obtained, peaks are detected in each of the spectrum (blocks 124A, 136B, 136C). Any appropriate peak detection technique may be used to do so.

Then the method comprises assessing if the coordinate is a reliable indicator for differentiating cuttings from the background surface (blocks 137A-137C). As shown in relationship with one of the coordinate, this operation comprises determining if there is more than one peak in the spectrum (block 138) for said coordinate. If the spectrum shows no peaks or only one peak, the method stops there for the coordinate (block 140). It is indeed considered that the coordinate is not a reliable indicator for differentiating cuttings from the background surface as the background surface and cuttings have features too close for the coordinate.

If the spectrum shows two peaks or more, like on FIG. 4, where all the spectra show two distinct peaks, the method proceeds to assessing if two of the detected peaks overlap is inferior to a predetermined threshold (block 142). Assessing if two peaks overlap is inferior to a predetermined threshold may be performed by comparing values representative of each of the two peaks. Such comparison may for instance include performing one or more tests such as assessing if the difference of the coordinate value (absciss value) at the maximum of each peak (in ordinate value) is over a predetermined threshold value. Such assessment is shown on FIG. 4 for the hue coordinate, wherein the maximum of each peak are designated as 143A, 143B and the distance or difference between two peaks is shown at 145. For the purpose of the example we will consider that the test here consists in determining if the difference between the coordinate value of two peaks is over 0.35.

However, the assessment may also comprise assessing if the number of pixels (ordinate) associated to the intersection of the peaks is under a predetermined threshold. The assessment may also comprise a comparison test of a variable including a variance or a standard deviation of each of the peaks to a threshold value, the variable being for instance a ratio of the distance between the coordinate values of the peak maxima versus the product of the standard deviation of each peak. A plurality of tests may be also performed for assessing if the peaks overlap is inferior to the predetermined threshold. If several tests are performed, the method may comprise giving a weight to each of the test or computing an indicator representative of the combination of the tests.

If the assessment shows that the two peaks overlap is above the predetermined threshold, like it is the case for the saturation and brightness in FIG. 4 (difference of the coordinate values of the peak maxima below 0.35), peaks are gathered and considered as one (block 144). In this case, method goes back to block 138 counting the new number of peaks and determining if it is greater than one. If not, the coordinate is not considered as forming a reliable indicator either. In the case of FIG. 4, saturation and brightness would not have been considered as a valid coordinate.

If the assessed peaks overlap is inferior to a predetermined threshold, which corresponds here to a distance between two peaks superior to a predetermined threshold, like it is the case for the hue spectra of FIG. 4 (distance 145=0.4), the method proceeds to test if all the peak combinations have been assessed (block 144), i.e. if the assessment for all the possible groups of two peaks have been performed. If not, method returns to block 142 in order to assess the remaining combination of peaks. If it is done, method goes on to block 146.

Concerning operation 144, all the combinations of peaks do not need to be assessed. Alternatively, the closest peak to a predetermined peak only is tested.

At block 146, the method determines at least a value representative of each peak. The determination may for instance comprise taking the coordinate value (absciss value) at the maximum of the peak (in ordinate) as shown on the corresponding spectrum, such as hue values 141A, 141B.

A more complex but more accurate approach may also be selected. Such approach may for instance include selecting a range of coordinate values (absciss values) corresponding to the peak (for instance the range situated between the coordinate values at the two minima of the peak). Ranges 147A, 147B are shown on FIG. 4 for the hue coordinate. The method may then comprise taking the non-filtered coordinate values of all the pixels belonging to this range for the predetermined coordinate. The value(s) representative of the peak for the predetermined coordinate is computed based on a statistical indicator representative of this set of pixels. Such indicators may be the mean of the coordinate value of the pixels situated in the pixel set, standard deviation or variance of coordinate value such set, etc.

When the values representative of each of the peaks are determined, the method comprises assigning a set of reference values, corresponding to or derived from the values representative of a peak, to a group representing a type of object (block 148). The type of objects comprises the background surface and at least one type of cuttings. The method here seeks at least to differentiate the background surface from the cuttings.

To do so, the method comprises a calibration operation (block 99) before the operation of assigning the reference values to the groups. The calibration operation comprises identifying at least a pixel representative of the background by clicking on it. It may also comprise clicking on several pixels representative of the background or taking an image of the background surface alone. From the obtained pixel coordinate value(s), all representative of the background surface, one or several calibration background reference values for each coordinate are obtained (for instance, when several pixels have been considered by obtaining the mean of the coordinate values of such pixels for each coordinate). The calibration operation has to take place before the assignment of the reference value to each of the groups. Here, it is shown just before the cuttings collection or after the image has been taken but it can happen any time before the assignment operation. It can even happen only once for a given type of background surface when the background surface is standardized and/or re-used. If not, the calibration may be performed for each image but is very short and easy.

When calibration background reference value(s) are obtained from the calibration, the assignment operation includes comparing at least a value representative of a peak (for instance, average or maximum) to the calibration background reference value, for instance by subtracting the reference value of the peak to the calibration background reference value. It also comprises determining a peak that would correspond to the background surface based on the comparison of the reference values of each peak to the calibration background reference value. In the example of FIG. 4, the peak associated to the background will be the peak for which the absolute difference between its reference value and the calibration background reference is the smallest one.

The reference value assigned to the group corresponding to the background surface group may be either the calibration background reference value or the reference value of the peak which is the closest to the background calibration reference value. The reference value of the one or several groups of cuttings may be the reference values of the other peaks.

When the reference values have been assigned to each group for each valid coordinate (in the example of FIG. 4 only hue for instance), the method may proceed to the pixel classification (block 150).

In this embodiment, the classification may be performed by computing a parameter representing the distance of the pixel compared to the reference values associated to each of the coordinates for a predetermined group. The classification may for instance be performed based on the following indicator calculating the distance $d_P^{Gk}$ from a pixel P to a group Gk:

$$d_P^{Gk} = \sqrt{\sum_{i=1}^{M} \left( \frac{X_P^i - \overline{X_{Gk}^i}}{\sigma_{Gk}^i} \right)^2}$$

Wherein $X_P^i$ is the coordinate value of the pixel for the coordinate i in the (H,S,B) coordinate space Wherein $\overline{X_{Gk}^i}$ is the mean of the coordinate values for the coordinate i of the group Gk (ie a reference value of the group Gk for the coordinate i), wherein the group Gk represents the group of pixels corresponding to a predetermined peak.

Wherein $\sigma_{Gk}^i$ is the standard deviation of the coordinate values for the coordinate i of the group Gk (ie another reference value of the group Gk for the coordinate i)

Wherein M is the number of valid coordinates for the classification (M≤3).

The pixel P is classified in group Gj among N groups according to the following equation $$G_j = \left\{ G_i \mid d_P^{Gi} = \min_{k=1 \ldots N} \left( d_P^{Gk} \right) \right\}$$

Figure 5:
FIG. 5 is a processed image showing pixels of the image of FIG. 2 classified according to the method of FIG. 2.

The classification operation may also comprise plotting the pixels belonging to each group with a different color as can be seen on the image 149 of FIG. 5, in which the cuttings zone, corresponding to the pixels belonging to the cuttings group is shown in white (151A) while the background zone, corresponding to the pixels belonging to the background group (151B) is shown in black. The classification operation may also comprise filtering the results of the classification for instance by removing the clusters of the group that comprise less than a few adjacent pixels.

Figure 6:
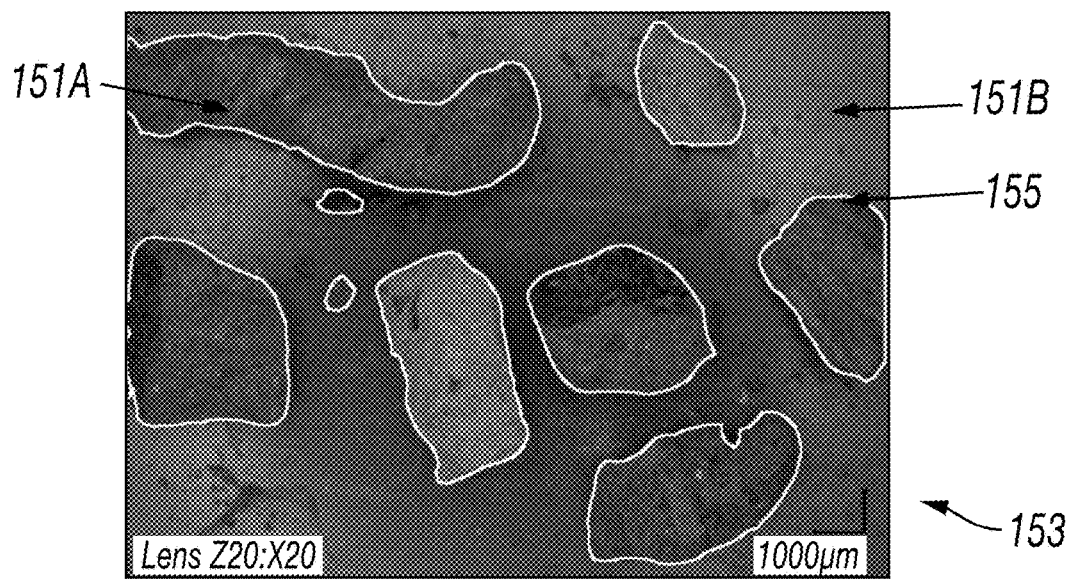
FIG. 6 is a processed image showing contours of cuttings zones in the image of FIG. 3 as obtained in relationship with the method of FIG. 2

Once each of the pixels are classified in each of the group, the method includes delimiting a cuttings zone (block 152) based on the classification, as can be seen on the image 153 of FIG. 6. The cuttings zone may for instance be delimited by detecting pixels of the cuttings group(s) that are adjacent to pixel from another group. The delimitation of the cuttings zone may also comprise plotting on the image the contour 155 of the cuttings zone. It can be seen on this image 153 that some clusters of small size have been filtered during classification.

It can be seen that the method as described hereinabove gives very good results with all the cuttings of significant size being detected as part of a cuttings zone and delimited properly.

In an optional embodiment, the method may also comprise assessing if a cuttings zone is likely to include a plurality of pieces of cuttings (block 154), and, if it is, estimating a splitting line within the zone in order to separate the cuttings zones into a plurality of subzones each corresponding to a cutting (block 156). The assessment operation includes detecting at least an external acute angle between two segments of the cuttings zone contour. Indeed, it is very rare to find an external acute angle in the same piece of cuttings while such angle is often a sign of several pieces of cuttings contacting each other in the same cuttings zone. The estimation of the splitting line that separates two pieces of cuttings in the same cuttings zone may comprise plotting a splitting line on the image. The line is traced from the vertex of the angle to the closest point of the contour on the opposite side of the cuttings zone. At block 158, a user may validate or not the splitting line or add splitting line on the image in view of its visual observation of the cuttings.

These operations enable an optimized detection particularly useful when the process of preparing the cuttings is not appropriate and when cuttings are not properly separated.

Figure 7:
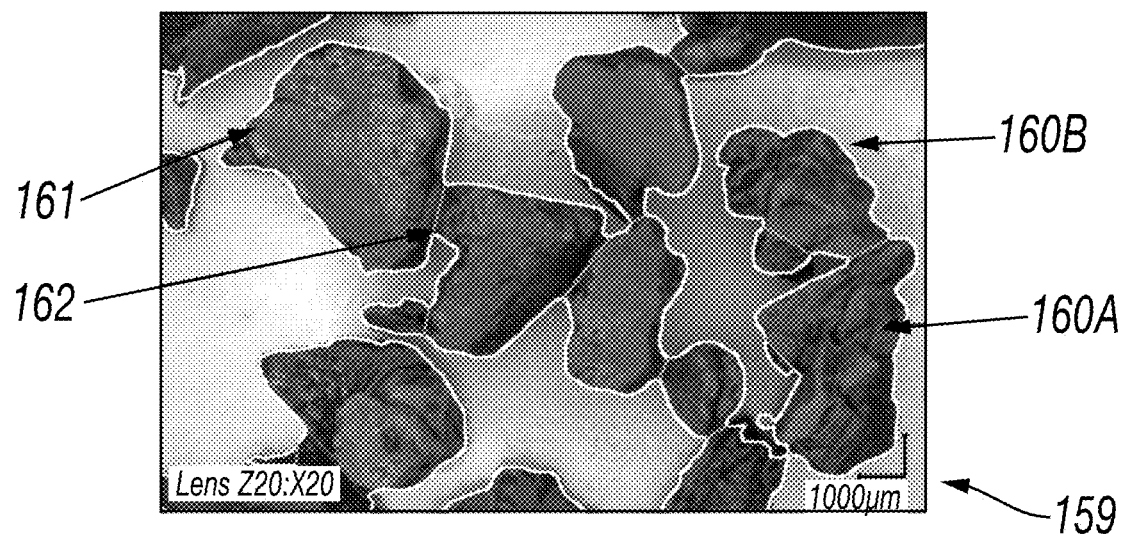
FIG. 7 shows a processed image obtained on the basis of another image than the image of FIG. 3, showing contours of cuttings zones and splitting line for splitting cuttings zones into subzones, obtained according to the method of FIG. 2.

To illustrate this embodiment, FIG. 7 shows an image 159 of cuttings in which the classification and delimitation operation have been performed (blocks 150 & 152). Pixels have been classified in cuttings zone 160A and background zone 160B and the cuttings zone has been delimiter by contour 161 shown in white. However, as cuttings are contacting in the cuttings zone, the classification 150 is not sufficient to differentiate each piece of cuttings from the next. Therefore, the operations 154 and 156 have been applied. The splitting lines 162 as determined automatically by the method are shown in grey. In this image, the validation operation by the user 158 has not been applied yet but most of the splitting lines indeed separate the pieces of cuttings.

When the zones and if necessary subzones have been identified, the method also comprises determining a parameter relative to each zone or subzone, for instance a dimension, such as a minimal or maximal dimension, an area, a perimeter, etc. (block 164). This may enable to give information at least on the volume of cuttings exiting the wellbore and optionally may be used as an indication on the nature of the cuttings released from the formation.

Once the cuttings are identified, other processing operations it may also be consider to apply other processing operations in order to get more information on the nature of the piece of cuttings.

The embodiment of the method that has been described hereinabove is only one exemplary embodiment of the disclosure.

Figure 8:
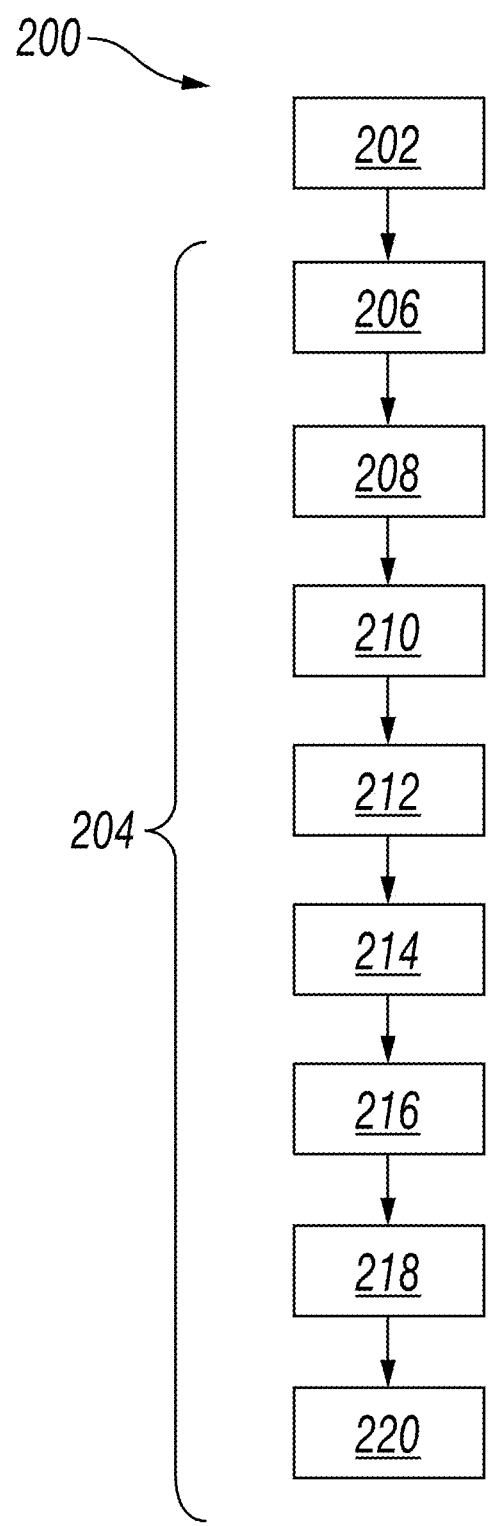
FIG. 8 is a flow diagram of a method according to another embodiment of the disclosure.

For instance, another method 200 according to an embodiment of the disclosure and shown on FIG. 8 may comprise taking an image of the cuttings on a predetermined background surface directly at the rig site, for instance when the cuttings are being conveyed on a conveyer or in a container having a predetermined background surface (block 202). This image is taken without preparation.

The method 200 then comprises analyzing the image (block 204). The analysis comprises, as explained in connection with the first embodiment, collecting the coordinate values of all of the pixels in the image in the (red, blue, green) space (block 206) and to convert these values in coordinate values in the (hue, saturation, brightness) coordinate space (block 208), as well as building a spectrum representative of one coordinate in the (H, S, B) space, for instance the hue (block 210). Indeed, the method is more accurate and flexible when taking into account the three coordinates of the (H, S, B) space but, when the background is chosen appropriately, it may have a values for a predetermined coordinate that is clearly sufficiently far from the ones of any cuttings for the predetermined coordinate so that the other coordinates do not need to be analyzed.

Then, the method comprises peak detection in the spectrum (block 212), determination of a representative value of a peak (block 214), corresponding for instance to the values for the hue coordinate at the peak maximum or to a range of hue values between the values of the hue coordinates at both peak minima. It also includes assigning the peaks to each of the groups (block 216), in particular to the background group, in view of a calibration performed beforehand by scanning the background surface without cuttings on it. One or both of discretization and peak overlap assessment may be applied to the method of the second embodiment for obtaining more accurate results before the peak assignment. Any other filtering technique may be applied to enhance accuracy of the result as part of the peak detection operation in particular when no discretization of the spectrum has been performed: for instance, a global peak may also be detected by gathering a plurality of local peaks by determining if the local peak is a local maximum or a global maximum by comparing it to its neighbors.

When the peaks have been assigned to the groups, classification (block 218) of the pixels of the image is performed. In this embodiment, classification may simply include comparing the hue coordinate of each pixel with the range of each peak for the hue coordinate value. If the hue coordinate of the pixel is in the hue range of the background surface peak, respectively cuttings peak, it is considered as a pixel belonging to the background zone, respectively cuttings zone. Based on the classification, cuttings zone is determined and delimited in the image, a zone comprising a cluster enclosing at least one or several adjacent pixels being classified in a cuttings zone (block 220).

The method according the disclosure enable to automatically detect and delimit pieces of cuttings in an image taken for instance by a microscope in any possible condition and with minimum user input.

The specific embodiments described above have been shown by way of example, and it should be understood that these embodiments may be susceptible to various modifications and alternative forms. For instance, the method has been disclosed in the previous specification with three loads but the number of loads can be any number greater than one. It should be further understood that the claims are not intended to be limited to the particular forms disclosed, but rather to cover modifications, equivalents, and alternatives falling within the spirit and scope of this disclosure.

The disclosure generally relates to a method for analyzing cuttings exiting a borehole comprising
  taking at least an image of a sample of cuttings on a background surface
  obtaining at least a spectrum representative of the image in the (hue, saturation, brightness) coordinate space, wherein each spectrum is associated to a coordinate and is representative of the distribution of the values of the pixels for said coordinate,
  based on the at least one spectrum and the values of each pixel for the at least one associated coordinate, classifying said pixel in one of a plurality of groups, wherein each group is representative of a type of objects within the image, at least one group being representative of the cuttings while one group is representative of the background surface,
  determining at least a cuttings zone in the image based on the classification of the pixels.

The method may comprise for at least one predetermined coordinate, assigning to each of the groups a set of reference values relative to the predetermined coordinate, wherein the set comprises at least one value, and wherein the classification comprises comparing the value of each pixel for the predetermined coordinate to the set of reference values assigned to each group.

The method may comprise detecting at least a peak in a spectrum associated to the predetermined coordinate, wherein assigning the set of reference values for said coordinate to a group comprises assigning a detected peak to the group, wherein the set of reference values is derived from at least a value representative of the peak. The at least one value representative of the peak may comprise at least one of the following: coordinate value of the maximum or of the minima of the peak, coordinate value of the mean of the peak, range of coordinate values belonging to the peak, variance or standard deviation of the peak The method may also comprise deriving at least one calibration background reference value relative to the predetermined coordinate from values of calibration pixels for the predetermined coordinate, wherein the calibration pixels are obtained either by selecting (for instance by clicking on) one or several pixels of the image situated in a section of the image representative of the background surface or by taking an image of the background surface containing no cuttings.

comparing the at least one representative value of each of the detected peaks with the at least one calibration background reference value, and assigning at least the set of reference values for the group representative of background surface based on the results of the comparison.

The method may also comprise:

detecting all the peaks in the spectrum associated to the predetermine coordinate, assessing if an overlap between two of the detected peaks is inferior to a predetermined threshold, if the overlap between two of the detected peaks is inferior to the predetermined threshold, deriving two sets of reference values for the predetermined coordinate from representative values of each of the peaks and assign the two sets to two distinct groups.

The overlap assessment of two peaks may be performed based on one or several of the coordinate value of the maximum or of the minima of the peaks, average coordinate value of the peaks, variance or standard deviation of the peaks.

The method may comprise performing the peak detection and optionally the overlap assessment for each spectrum, associated to each of the coordinates, and selecting for the classification only coordinates for which the associated spectrum contains at least two peaks, optionally for which the overlap is inferior to the predetermined threshold.

Classifying the pixel may comprise calculating for each pixel a parameter measuring the likelihood for said pixel to belong to one of the groups, wherein the parameter depends on the coordinate value of the pixel and the at least one reference value for said group, for each of the selected coordinates, the result of the classification being based on the comparison of the parameters obtained in relationship with each group.

The Method may also comprise collecting a sample of cuttings at the exit of the borehole.

The image may also be taken with an electronic or optical microscope.

Obtaining at least a spectrum may also comprise for a coordinate, estimating the spectrum by collecting the values of all the pixels for said coordinate, and filtering the spectrum, for instance discretizing the estimated spectrum. In this case, the values representative of a peak may be obtained by obtaining a peak range corresponding to all the coordinate values between the coordinate values at each minimum of the peak, selecting all the pixels having a coordinate value in the peak range for the predetermined coordinate and deriving from the values of the selected pixels at least a statistical indicator, wherein the representative value of the peak comprises the statistical indicator.

The method may also include determining a least a contour of a cuttings zone for delimiting the cuttings zone.

The method may also comprise assessing if a cuttings zone is likely to include a plurality of pieces of cuttings, and, if it is, estimating a splitting line within the zone in order to separate the cuttings zones into a plurality of subzones each corresponding to a piece of cutting. The estimation of a splitting line may comprise detecting at least an external acute angle between two segments of the cuttings zone contour. The estimation of the splitting line may also comprise linking the vertex of the external acute angle to the closest point of the contour on the opposite side of the cuttings zone.

The method may also comprise determining a parameter representative of the dimensions of each cutting zone or subzone, such as a perimeter, an area, a minimal dimension, a maximal dimension.

The disclosure also generally relates to a system for analyzing cuttings exiting a borehole comprising an imaging device for taking at least an image of a sample of cuttings on a background surface a calculator configured to, for at least one of the images,
obtain at least a spectrum representative of the image in the (hue, saturation, brightness) coordinate space, wherein each spectrum is associated to a coordinate and is representative of the distribution of the values of the pixels for said coordinate, based on the at least one spectrum and the values of each pixel for the at least one associated coordinate, classify said pixel in one of a plurality of groups, wherein each group is representative of a type of objects within the image, at least one group being representative of the cuttings while one group is representative of the background surface, determine at least a cuttings zone in the image based on the classification of the pixels.

The system and especially the calculator may be configured to perform all of the operations as disclosed hereinabove and in relationship with the method.

The disclosure also generally related to a computer program for analyzing cuttings exiting the wellbore based on an image of a sample of the cuttings on a background surface, comprising machine-readable instructions to:

obtain at least a spectrum representative of the image in the (hue, saturation, brightness) coordinate space, wherein each spectrum is associated to a coordinate and is representative of the distribution of the values of the pixels for said coordinate, based on the at least one spectrum and the values of each pixel for the at least one associated coordinate, classify said pixel in one of a plurality of groups, wherein each group is representative of a type of objects within the image, at least one group being representative of the cuttings while one group is representative of the background surface, determine at least a cuttings zone in the image based on the classification of the pixels.

The computer program may comprise machine-readable instructions to perform all of the operations as disclosed hereinabove and in relationship with the method.

The invention claimed is:

1. A method for analyzing cuttings exiting a borehole comprising taking at least an image of a sample of cuttings on a background surface obtaining at least a spectrum representative of the image in the (hue, saturation, brightness) coordinate space, wherein each spectrum is associated to a coordinate and is representative of the distribution of the values of the pixels for said coordinate, assigning a set of reference values relative to the predetermined coordinate to at least a group, wherein the set comprises at least one value, wherein each group is representative of a type of objects within the image, at least one group being representative of the cuttings while one group is representative of the background surface, wherein assigning a set of reference values comprises deriving at least one calibration background reference value relative to the predetermined coordinate from values of calibration pixels for the predetermined coordinate and assigning the set of values for the group representative of background based on the calibration background reference value, wherein the calibration pixels are obtained either by selecting one or several pixels of the image situated in a section of the image representative of the background surface or by taking an image of the background surface containing no cuttings, based on the at least one spectrum and the values of each pixel for the at least one associated coordinate, classifying said pixel in one of a plurality of groups, wherein the classification comprises comparing the value of each pixel for the predetermined coordinate to the set of reference values assigned to at least one group, determining at least a cuttings zone in the image based on the classification of the pixels.

2. The method according to claim 1, wherein classifying the pixel comprises calculating for each pixel a parameter measuring the likelihood for said pixel to belong to one of the groups, wherein the parameter depends on the coordinate value of the pixel and the at least one reference value for said group, for each of the selected coordinates, the result of the classification being based on the comparison of the parameters obtained in relationship with each group.

3. The method according to claim 1, wherein the image is an image taken with an electronic or optical microscope.

4. The method according to claim 1, wherein obtaining at least a spectrum comprises, for a coordinate, estimating the spectrum by collecting the values of all the pixels for said coordinate, and discretizing the estimated spectrum.

5. The method according to claim 1, including determining a least a contour of a cuttings zone for delimiting the cuttings zone.

6. The method according to claim 1, comprising assessing if a cuttings zone is likely to include a plurality of pieces of cuttings, and, if it is, estimating a splitting line within the zone in order to separate the cuttings zones into a plurality of subzones each corresponding to a piece of cutting.

7. The method according to claim 6, wherein the estimation of a splitting line comprises detecting at least an external acute angle between two segments of the cuttings zone contour.

8. The method according to claim 7, wherein the estimation of the splitting line comprises linking the vertex of the external acute angle to the closest point of the contour on the opposite side of the cuttings zone.

9. A system for analyzing cuttings exiting a borehole comprising
an imaging device for taking at least an image of a sample of cuttings on a background surface
a calculator configured to, for at least one of the images:
obtain at least a spectrum representative of the image in the (hue, saturation, brightness) coordinate space, wherein each spectrum is associated to a coordinate and is representative of the distribution of the values of the pixels for said coordinate, assign a set of reference values relative to the predetermined coordinate to at least a group, wherein the set comprises at least one value, wherein each group is representative of a type of objects within the image, at least one group being representative of the cuttings while one group is representative of the background surface, wherein assigning a set of reference values comprises deriving at least one calibration background reference value relative to the predetermined coordinate from values of calibration pixels for the predetermined coordinate, wherein the calibration pixels are obtained either by selecting one or several pixels of the image situated in a section of the image representative of the background surface or by taking an image of the background surface containing no cuttings, based on the at least one spectrum and the values of each pixel for the at least one associated coordinate, classify said pixel in one of a plurality of groups, wherein the classification comprises comparing the value of each pixel for the predetermined coordinate to the set of reference values assigned to at least one group, determine at least a cuttings zone in the image based on the classification of the pixels.

10. A non-transitory computer-readable medium for analyzing cuttings exiting the wellbore based on an image of a sample of the cuttings on a background surface, storing machine-readable instructions to:

obtain at least a spectrum representative of the image in the (hue, saturation, brightness) coordinate space, wherein each spectrum is associated to a coordinate and is representative of the distribution of the values of the pixels for said coordinate, assign a set of reference values relative to the predetermined coordinate to at least a group, wherein the set comprises at least one value, wherein each group is representative of a type of objects within the image, at least one group being representative of the cuttings while one group is representative of the background surface, wherein assigning a set of reference values comprises deriving at least one calibration background reference value relative to the predetermined coordinate from values of calibration pixels for the predetermined coordinate, wherein the calibration pixels are obtained either by selecting one or several pixels of the image situated in a section of the image representative of the background surface or by taking an image of the background surface containing no cuttings, based on the at least one spectrum and the values of each pixel for the at least one associated coordinate, classify said pixel in one of a plurality of groups, wherein the classification comprises comparing the value of each pixel for the predetermined coordinate to the set of reference values assigned to at least one group, determine at least a cuttings zone in the image based on the classification of the pixels.

* * * * *